(12) United States Patent
Niederberger et al.

(10) Patent No.: US 9,925,716 B2
(45) Date of Patent: Mar. 27, 2018

(54) AUTOMATIC WELDING MACHINE

(71) Applicant: Leister Technologies AG, Kägiswil (CH)

(72) Inventors: Adolf Niederberger, Kagiswil (CH); Mathias Frei, Lucerne (CH); Bruno von Wyl, Kagiswil (CH)

(73) Assignee: Leister Technologies AG, Kägiswil (CH)

(*) Notice: Subject to any disclaimer, the term of this patent is extended or adjusted under 35 U.S.C. 154(b) by 0 days.

(21) Appl. No.: 15/433,192

(22) Filed: Feb. 15, 2017

(65) Prior Publication Data
US 2017/0239880 A1    Aug. 24, 2017

(30) Foreign Application Priority Data

Feb. 18, 2016   (EP) .................................... 16156235

(51) Int. Cl.
    *B29C 65/00*    (2006.01)
    *B29C 65/02*    (2006.01)
    (Continued)

(52) U.S. Cl.
    CPC .............. *B29C 65/02* (2013.01); *B29C 66/81* (2013.01); *B29C 65/20* (2013.01); *B29C 66/814* (2013.01);
    (Continued)

(58) Field of Classification Search
CPC ....... B29C 65/02; B29C 65/20; B29C 66/814; B29C 66/8161; B29C 66/82;
(Continued)

(56) References Cited

U.S. PATENT DOCUMENTS

| | | | |
|---|---|---|---|
| 1,968,881 A * | 8/1934 | Edwards ................. | B65C 1/021<br>101/27 |
| 2,982,069 A * | 5/1961 | England .................. | B29C 65/18<br>100/2 |

(Continued)

FOREIGN PATENT DOCUMENTS

| | | |
|---|---|---|
| CA | 1 096 286 A | 2/1981 |
| DE | 297 19 436 U1 | 2/1998 |

(Continued)

OTHER PUBLICATIONS

European Search Report dated Jul. 19, 2016 for corresponding European Application No. EP 16 15 6235.

*Primary Examiner* — Mark A Osele
*Assistant Examiner* — Nickolas Harm
(74) *Attorney, Agent, or Firm* — Renner Otto Boisselle & Sklar, LLP

(57) ABSTRACT

An automatic welding machine, comprising a supporting frame and a tensioning device for reversibly joining at least two opposing booms to one another and applying a tension force between these, having an open position in which the opposing booms are separated from one another by a gap and a closed position in which the opposing booms are joined to one another and braced with respect to one another. One boom is mounted in a torsion-proof manner on the tensioning device and is pivotable in relation to the other boom and can be moved out of the open position into the closed position by the pivoting of the tensioning device. The tension force is generated by way of a spring-loaded element disposed on the tensioning device, wherein the spring-loaded element, at one end, is rigidly connected to a supporting element of the tensioning device and, at the other end, is pivotably mounted on the supporting frame by way of a double swivel joint, and the spring-loaded element is tensioned by the pivoting of the double swivel joint out of the open position into the closed position, whereby a torque is applied onto the pivotable boom.

11 Claims, 4 Drawing Sheets

(51) Int. Cl.
*B29L 7/00* (2006.01)
*B29C 65/20* (2006.01)

(52) U.S. Cl.
CPC .......... *B29C 66/8161* (2013.01); *B29C 66/82* (2013.01); *B29C 66/8221* (2013.01); *B29C 66/8362* (2013.01); *B29C 66/86523* (2013.01); *B29L 2007/008* (2013.01); *Y10T 156/18* (2015.01)

(58) Field of Classification Search
CPC ............ B29C 66/8221; B29C 66/8362; B29C 66/86523; Y10T 156/18
USPC .................................. 156/502, 583.1, 583.8
See application file for complete search history.

(56) References Cited

U.S. PATENT DOCUMENTS

| | | | | |
|---|---|---|---|---|
| 3,149,560 | A * | 9/1964 | Finke | A41H 43/04 100/219 |
| 3,944,460 | A * | 3/1976 | Karr | B29C 65/20 100/33 PB |
| 4,172,750 | A * | 10/1979 | Giulie | B29C 65/18 100/137 |
| 4,272,314 | A * | 6/1981 | Banai | B29C 65/20 100/33 PB |
| 5,051,148 | A | 9/1991 | Resch | |
| 5,435,883 | A * | 7/1995 | Myers | B30B 1/12 100/50 |
| 5,653,095 | A * | 8/1997 | Stamm | B65B 13/22 100/32 |
| 6,186,210 | B1 | 2/2001 | Gehde | |
| 6,805,179 | B2 * | 10/2004 | Velasquez | B32B 37/226 156/353 |
| 2004/0011472 | A1 * | 1/2004 | Zurmuhle | B29C 65/10 156/502 |
| 2015/0239173 | A1 * | 8/2015 | Gisler | B32B 37/0046 156/583.1 |

FOREIGN PATENT DOCUMENTS

| | | |
|---|---|---|
| EP | 0 406 223 A2 | 1/1991 |
| FR | 2 339 476 A1 | 8/1977 |

* cited by examiner

AUTOMATIC WELDING MACHINE

CROSS-REFERENCE TO RELATED APPLICATION

The present application claims priority under 35 USC § 119 to European Patent Application No. 16 156 235.0 filed on Feb. 18, 2016, the entire disclosure of which is incorporated herein by reference.

TECHNICAL FIELD

The invention relates to an automatic welding machine for fusing plastic webs, comprising a movable supporting frame, a heating device for partially melting the plastic webs, at least two opposing booms comprising pressing and advancing rollers, at least one driving device, and a tensioning device that is mounted on the supporting frame and comprises an actuating element for reversibly joining the booms and applying a tension force between these, having an open position in which the opposing booms are separated by a gap and a closed position in which the opposing booms are joined to one another and braced with respect to one another, wherein one boom is mounted pivotably in relation to the other boom and brought from the open position into the closed position by the actuation of the tensioning device.

DESCRIPTION OF THE RELATED ART

Automatic welding machines of this type are generally known and used to fuse films, made of plastic, for example, tarpaulins and other planar materials. The plastic webs are plasticized in the seam region by way of heat input and subsequently compressed under the action of pressure. So as to apply the pressure, tensioning devices are provided on the automatic welding machines. Furthermore, devices for closing or opening system components, such as pressing or advancing rollers, are provided. When lap welding films, for example, the individual film webs must be disposed so as to overlap on the intended seam region and fixed, and additionally a heat source must be moved close to the webs to be fused to one another and a joining pressure must be applied. The individual functions are usually divided into individual steps from mechanical and control points of view; however, this makes handling more cumbersome and time-consuming.

SUMMARY

It is therefore the object of the invention to propose an automatic welding machine comprising a compact tensioning device which, in one step, not only closes a gap between two opposing booms, but also applies a tension force between the closed booms, while allowing one-handed operation. The tensioning process should be reversible.

This object is achieved according to the invention by an automatic welding machine having the features described herein.

A tensioning device is provided in the automatic welding machine according to the invention so as to provide reversible joining of opposing booms and apply a tension force between these. This is achieved by pivoting a double swivel joint, which is disposed pivotably on the tensioning device and by way of which a boom that is disposed on the tensioning device in a torsion-proof manner is pivoted in relation to the opposing boom. At the same time, the pivoting of the double swivel joint causes a spring-loaded element disposed on the tensioning device to be compressed or relaxed. At one end, the spring-loaded element is disposed fixedly on a supporting element for the tensioning device that is fastened to the supporting frame, and at the other end, this is pivotably disposed on the actuating lever so as to be pivoted eccentrically with respect to the rotational axis of the actuating lever, resulting in a compression/relaxation of the spring-loaded element. The rotational axis of the actuating lever is different from the rotational axis of the spring-loaded element. The two axes run parallel to one another. Thus, there are two end positions. In the open end position, the opposing booms are separated by a maximum gap, while the opposing booms are joined to one another in a closed end position. Moreover, in the closed end position, the restoring spring force of the spring-loaded element acts as torque on the pivotable boom, so that the opposing booms are braced with respect to one another. The tensioning device operates reversibly, which is to say no irreversible joining of the two booms takes place, and the pivotable boom can be pivoted back into the open position. The booms can act as grippers when used alone or receive arbitrary tools at the free ends thereof.

The tension force acting between the booms is dependent on the torque applied by the spring-loaded element on the pivotable boom and the length of the pivotable boom. The torque is derived from the cross product of the distance vector (fulcrum of the actuating lever to the point of engagement of the spring-loaded element on the supporting element) and the force vector of the spring-loaded element. Accordingly, the tension force can be adapted to the respective usage purpose by replacing the spring-loaded element with a different spring characteristic curve.

The supporting element and the pivotable boom are advantageously rigidly connected to one another and disposed pivotably about a shared axis, so that an appropriate actuation of the actuating lever causes the boom to be pivoted about this axis and the advancing roller to be brought into the closed or open position.

In a preferred embodiment of the tensioning device, a replacement of the spring-loaded element is provided. The spring-loaded element is disposed easily accessibly on the tensioning device and can be removed in just a few steps, for example by unscrewing a nut and pulling out the spring-loaded element. A different spring-loaded element can be inserted just as quickly and easily. Instead of replacing the spring-loaded element, this may also be preloaded so as to operate in a different spring characteristic curve range. The preload can be quickly and easily set, for example by way of a nut. Providing both options for setting the tension force in a tensioning device is an obvious choice.

It has proven advantageous to use a wound torsion spring, a so-called helical spring, as the spring-loaded element. Helical springs have a compact design and can be designed to have diverse characteristics by way of regions having a variable wire diameter, variable lead or variable spring diameter.

A further preferred embodiment of the tensioning device provides for an actuating lever that is rigidly connected to the double swivel joint. A certain torque is necessary to pivot the double swivel joint. The two fulcrums of the double swivel joint on the actuating lever are disposed at a relatively close distance from one another, so that the lever action of the actuating lever noticeably reduces the force necessary to operate the tensioning device. Serving as an extension of the double swivel joint, the actuating lever can also be designed in one piece therewith. This reduces the number of individual components of the tensioning device, and the overall design of the device becomes more robust and less maintenance-intensive. For improved haptics, the actuating lever can be ergonomically shaped and/or comprise a handle.

As an alternative or in addition to manually applying the necessary torque for pivoting the double swivel joint, the double swivel joint can be pivoted by way of a motor. In this embodiment, the motor is preferably disposed on the tensioning device and applies the necessary torque to the rotational axis of the double swivel joint. The motor is preferably an electric motor. The motor is controlled by way of a button, switch or turning knob, which can be disposed directly on the tensioning device or on the automatic welding machine.

In a further embodiment, the tensioning device can be locked both in the open position and the closed position in the spirit of improved handling. For this purpose, an axis of action of the spring-loaded element, in which the spring force acts traverses, the rotational axis of the double swivel joint in the respective end position of the double swivel joint. As a result, a portion of the spring force acts against a pivoting of the double swivel joint out of the respective end position, whereby inadvertent opening/closing of the booms or a drop in the tension force is avoided. The locking function allows convenient and safe access to and between the booms, for example to position new material to be clamped or attach and remove the tools supported by the booms.

In addition to the basic functions described (joining opposing booms and applying a tension force between these), an advantageous embodiment of the tensioning device provides for the integration of further useful functions, depending on the application. Using further double swivel joints disposed on the tensioning device, it is possible to move additional devices connected to the tensioning device by way of the double swivel joints. It is possible to implement linear movements, such as during compression and relaxation of the spring-loaded element, or pivoting movements, such as in the case of the pivotable boom. A significant advantage of integrating further functions is that all these functions can be carried out synchronously in one step by pivoting the central double swivel joint. In this way, it is possible to move additional tools, such as a heating device for partially melting material clamped between the booms, to the joining site between the closed booms, wherein the tool is moved into the usage position along a linear mounting, or pivoted out of a waiting position.

In a further embodiment, the heating device is designed as a hot air blower comprising a hot air nozzle oriented at the seam region of the plastic webs to be fused. The hot air stream can either be directed uniformly distributed along the seam region at the material to be fused or focused in certain spots by multiple nozzle openings, which are distributed across the width of the hot air nozzle.

As an alternative to the hot air blower, the heat input into the material to be fused can also take place by way of a hot wedge. In this case, the hot wedge is disposed in a feed device between the plastic webs to be fused and, prior to starting the welding process, must be moved to the seam area and locked in this position.

A combined heating device comprising both a hot air blower and a hot wedge in an automatic welding machine is advantageous, since this allows a broader selection of plastic materials in terms of the material and web thickness to be processed by way of an apparatus.

By shifting the actuating lever into the end position, in which the opposing pressing and advancing rollers are closed, the respective heating device is moved to the plastic webs to be fused. To this end, the heating device is movably (for example pivotably or linearly displaceably) disposed on the supporting frame and brought into the welding position, and out of the welding position, via a mounting, by way of a lever eccentrically connected to the actuating lever.

The tensioning device allowing one-handed operation by way of the actuating lever thus moves the opposing pressing and advancing rollers to the plastic films, applies the necessary pressing pressure, and prompts the potentially present heating device to be extended. The combination of these steps simplifies the operation of the automatic welding machine.

BRIEF DESCRIPTION OF THE DRAWINGS

Hereafter, the invention will be described in more detail based on one exemplary embodiment that is illustrated in the drawings. Additional features of the invention will be apparent from the following description of the exemplary embodiment of the invention in conjunction with the claims and the accompanying drawings. The individual features of the invention can be implemented either alone or as several together in different embodiments of the invention. In the drawings:

DETAILED DESCRIPTION OF THE INVENTION

Figure 1:
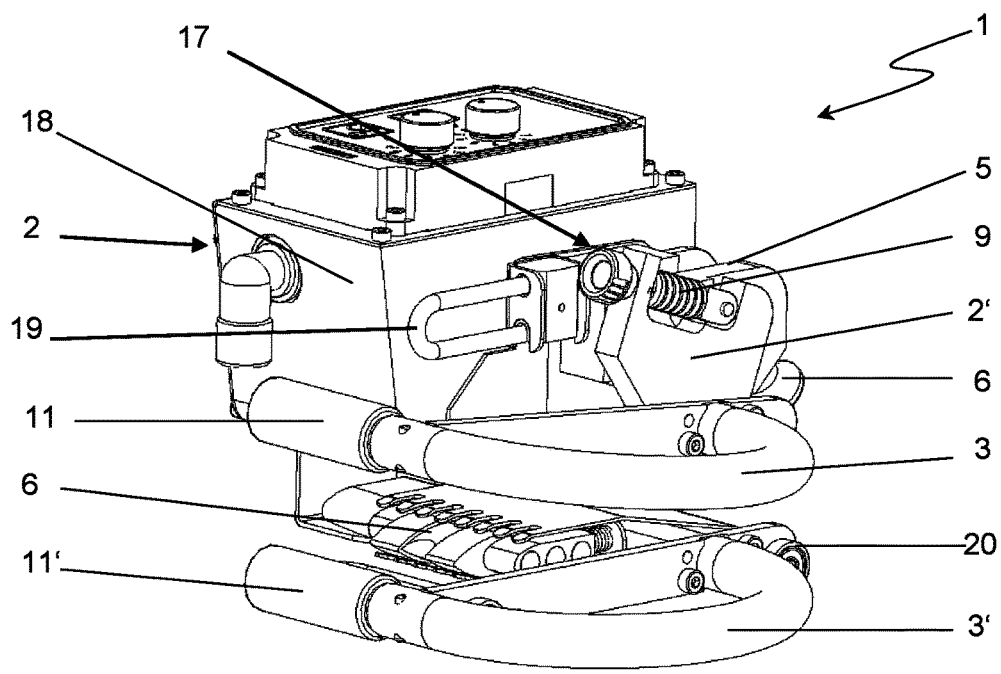
FIG. 1 shows an isometric representation of the automatic welding machine according to the invention, comprising opposing pressing and advancing rollers, in an open position.

FIG. 1 shows an automatic welding machine 1 according to the invention for fusing plastic webs, which are not shown in the drawing. The shown automatic welding machine is an exemplary embodiment, in which the pressing and advancing rollers 11 and 11' are each driven by way of a flexible shaft, which is not shown. A supporting frame 2 of the automatic welding machine 1 is displaceably supported on drive rollers 20. By way of example, the supporting frame 2 comprises a housing 18, which houses a driving device, which is not shown in the drawing, comprising a drive motor and at least one gearbox. A pillow block, which is not visible and forms part of the supporting frame 2, is also fastened to the housing 18 or the supporting frame 2 and the tensioning device 17 is mounted and fixed thereon. A supporting element 2', which in the present exemplary embodiment is fastened to the housing 18, on the sides of which in turn two booms 3, 3' are disposed, forms part of the tensioning device 17. The lower, fixed boom 3' is connected to the supporting element 2' in a torsion-proof manner, while the upper, pivotable boom 3 is mounted rotatably in a vertical plane to the supporting frame 2 by way of the supporting element 2'. The two booms 3, 3' are U-shaped in the present exemplary embodiment and at the free ends thereof each carry a pressing roller 11 and an advancing roller 11'.

Figure 3A:
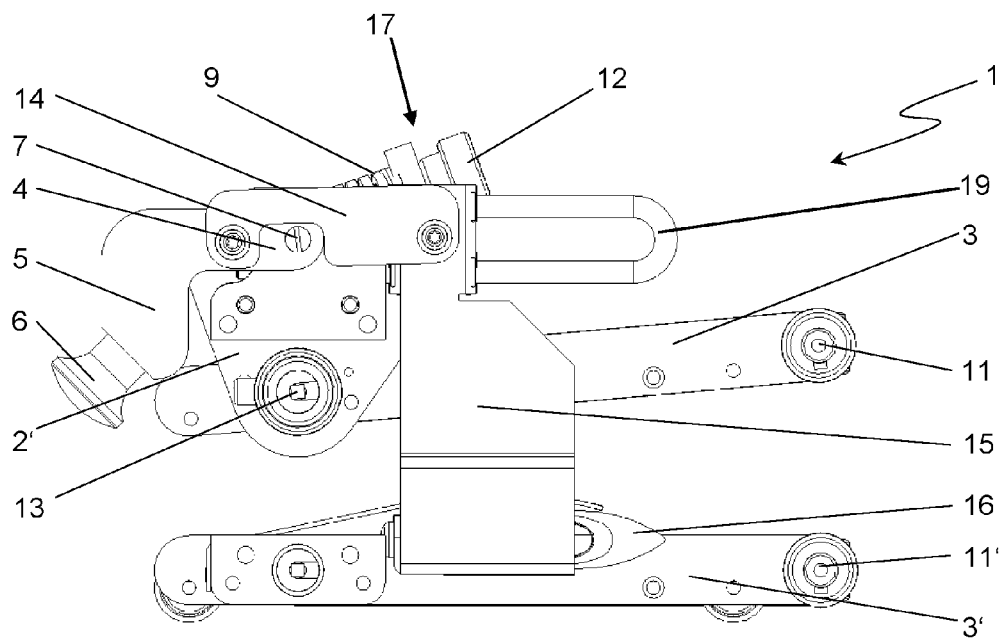
FIG. 3a shows a schematic representation of only the elements related to the tensioning device, comprising opposing pressing and advancing rollers, in an open position.
Figure 3B:
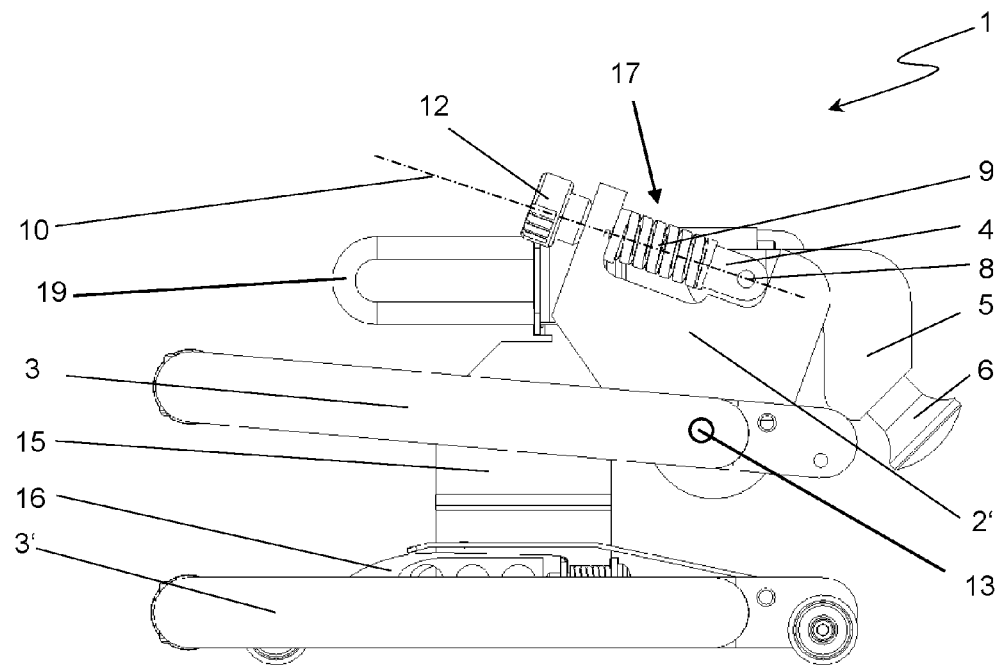
FIG. 3b shows a view of FIG. 3a rotated 180°.

By pivoting the pivotable boom 3, a gap between the pressing and advancing rollers 11 and 11' is closed, and the plastic webs disposed therebetween are clamped for the welding process. The pivoting of the pivotable boom 3 takes place by way of an actuating lever 5 of the tensioning device 17, which is described hereafter in greater detail in conjunction with FIGS. 3 to 5.

As an additional embodiment of the automatic welding machine 1, a heating element carrier 15 comprising a hot wedge 16 is also shown in FIG. 1. In the illustrated embodiment, the hot wedge 16 is mounted linearly movably on the supporting frame 2 and, for the welding process, must be moved to a weld seam between the pressing and advancing rollers 11, 11'. The position of the hot wedge 16 can likewise be controlled by way of the actuating lever 5. As an alternative or in addition, the heating element carrier 15 can be implemented with a hot air blower, which is not provided in the illustrated embodiment, and a hot air nozzle directed at the plastic webs to be fused together.

Figure 2:
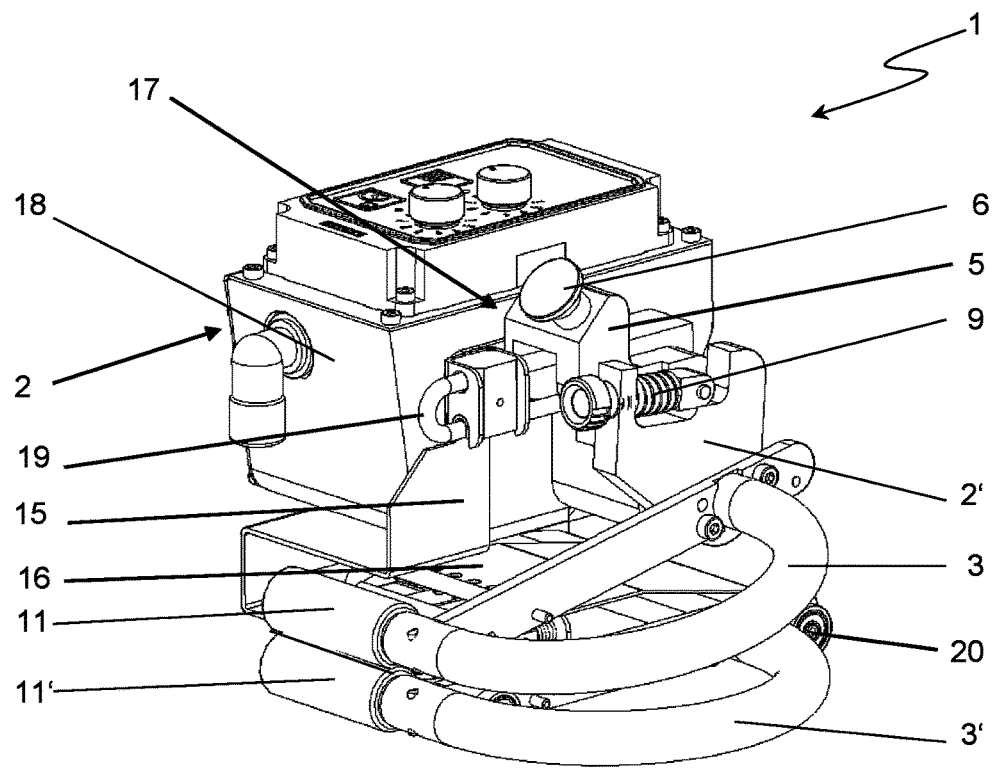
FIG. 2 shows an isometric representation of the automatic welding machine according to the invention, comprising opposing pressing and advancing rollers, in a closed position and with a pressing force applied.

FIG. 2 shows the automatic welding machine 1 described in FIG. 1, however with the actuating lever 5 shifted into another end position. In this position, the opposing pressing and advancing rollers 11, 11' are closed.

Figure 4A:
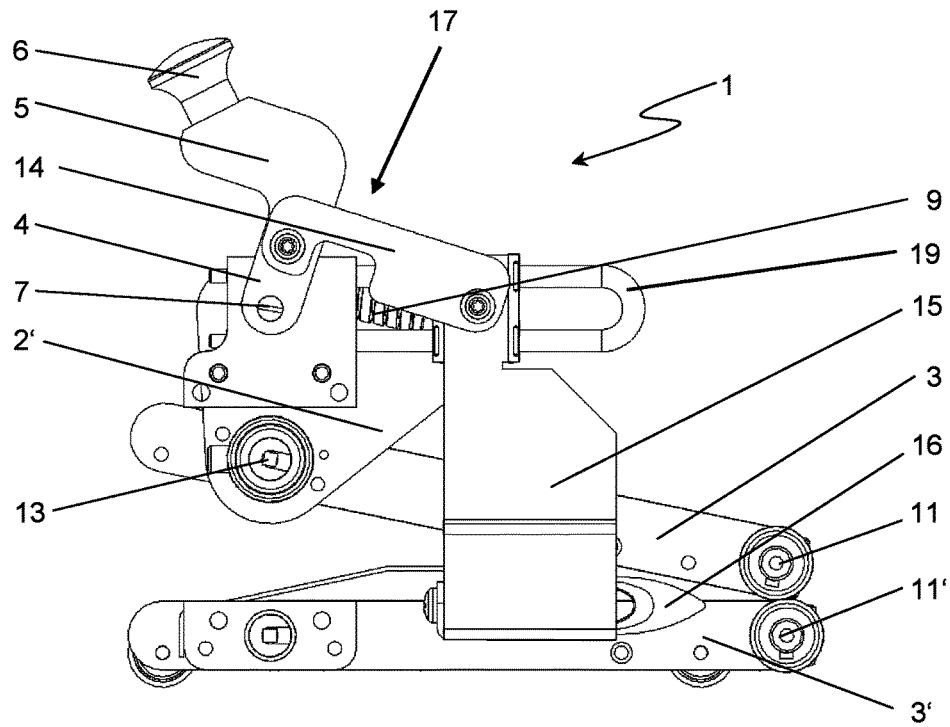
FIG. 4a shows a schematic sectional representation of only the elements related to the tensioning device, comprising opposing pressing and advancing rollers, in an intermediate position.
Figure 4B:
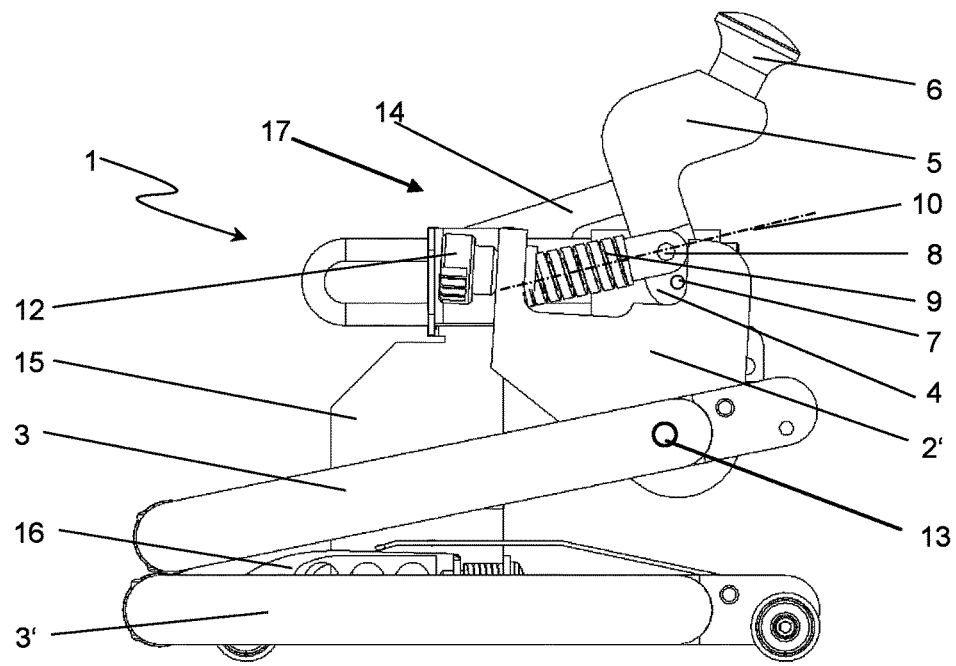
FIG. 4b shows a view of FIG. 4a rotated 180°.
Figure 5A:
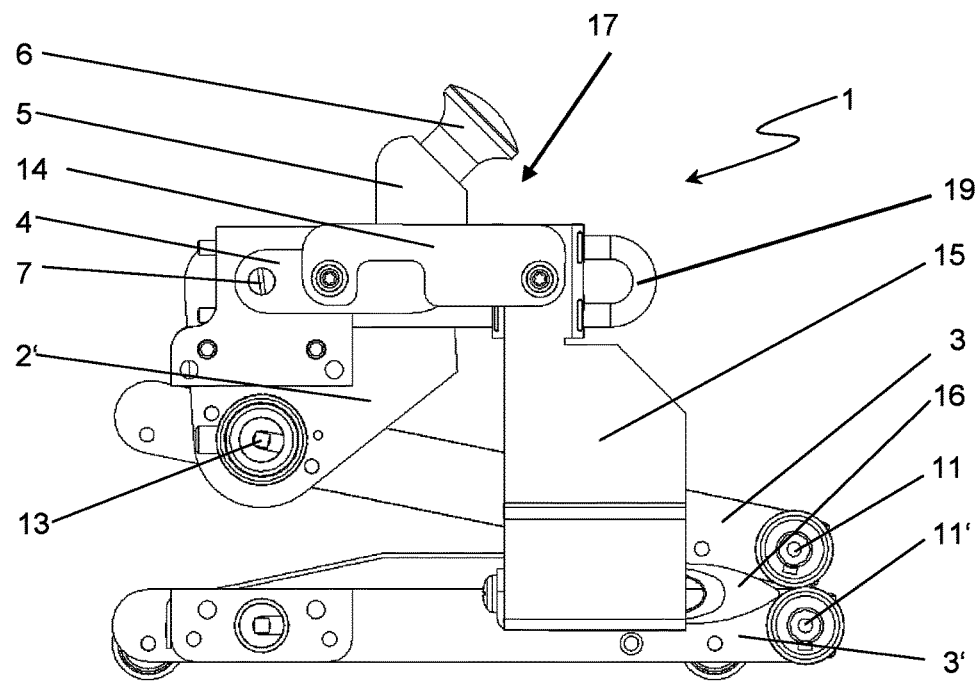
FIG. 5a shows a schematic sectional representation of only the elements related to the tensioning device, comprising opposing pressing and advancing rollers, in a closed position, with the hot wedge extended.
Figure 5B:
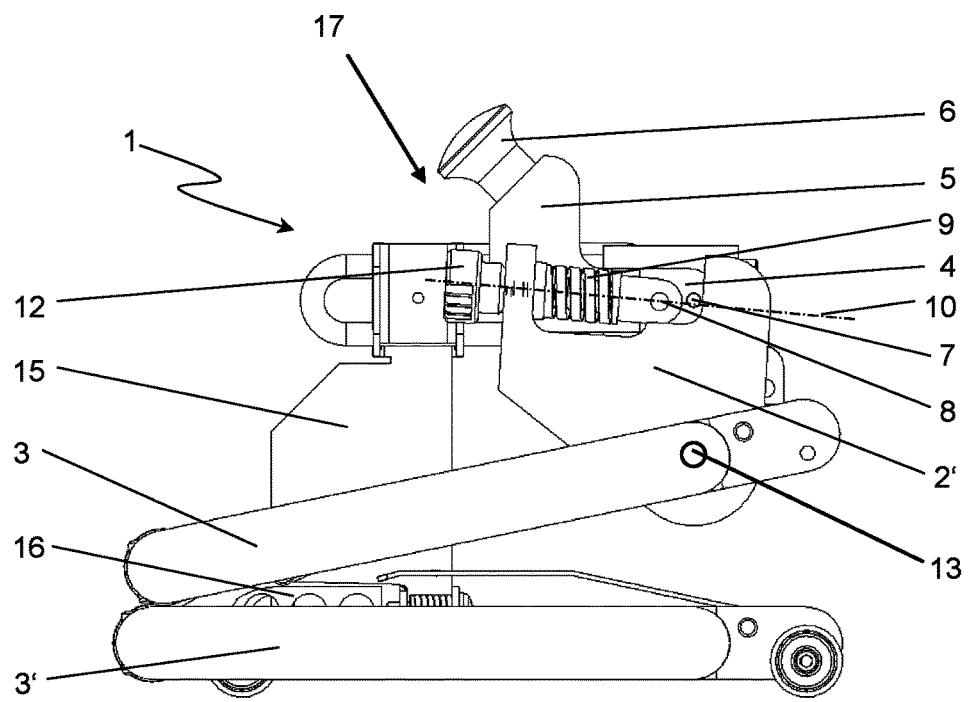
FIG. 5b shows a view of FIG. 5a rotated 180°.

FIGS. 3a to 5b show the automatic welding machine 1 according to the invention in a schematic sectional illustration. For the sake of improved clarity, the housing 18 is not shown. FIGS. 3a to 5b show the tensioning device 17 according to the invention as a component of the exemplary automatic welding machine 1 for reversibly joining the opposing booms 3, 3' to one another and applying a tension force between these. The figures, in pairs, each show the tensioning device 17 in a certain position. Proceeding from the open position of the opposing booms 3, 3' shown in FIGS. 3a and 3b, FIGS. 4a and 4b show the tensioning device 17 in an intermediate position in which the booms 3, 3' are joined to one another, but no tension force is yet applied, while FIGS. 5a and 5b show the tensioning device 17 in a closed position in which the booms 3, 3' are joined to one another and a tension force is applied.

The illustrated tensioning device 17 is a preferred embodiment of the invention comprising a double swivel joint 4, which is extended on one side and shaped as an actuating lever 5. For improved haptics, a handle 6 is provided on the actuating lever 5.

The double swivel joint 4 or the actuating lever 5 has two rotational axes 7 and 8. Via the rotational axis 7, the actuating lever 5 is pivotably mounted on the supporting frame 2 and the supporting element 2'. The spring-loaded element 9 in the form of a helical spring 9 is rotatably mounted with the one end about the rotational axis 8. At the other end, the helical spring 9 is rigidly disposed on the tensioning device 17. The spring force of the helical spring 9 acts in an axis of action 10 of the helical spring 9. In the two end positions (open and closed) of the tensioning device 17, the axis of action 10 traverses the rotational axis 7 of the double swivel joint 4, so that a portion of the spring force is directed against a pivoting of the double swivel joint 4 out of the respective end position. In this way, inadvertent opening or closing of the booms 3, 3' is avoided. This locking function of the tensioning device 17 improves handling (free access to the tools 11, 11' at the free ends of the booms 3, 3'), while also increasing safety.

The illustrated exemplary embodiment of the tensioning device 17 comprises a replaceable and settable helical spring 9. The helical spring 9 can be preloaded by way of a nut 12 and thus operated in a different spring characteristic curve range. By unscrewing the nut 12, the helical spring 9 can be removed and replaced. The helical spring 9 can thus be adapted in a wide range to the particular usage range, both in terms of the spring characteristic curve (linear, progressive, degressive) and in terms of the spring force, and the tensioning device 17 can be used for a variety of applications. The defined spring force applies a torque onto the supporting element 2' about a bearing point 13, at which the supporting element 2' and the boom 3 connected thereto in a torsion-proof manner are pivotably mounted on the supporting frame 2 of the automatic welding machine 1. In FIGS. 4a and 4b, the helical spring 9 is bent from start to end, even if this is not clearly apparent from the figures.

In addition to joining opposing booms 3, 3' to one another and applying a defined tension force between these, the tensioning device 17 shown in the figures can assume still another function as an additional exemplary embodiment. For this purpose, a further double swivel joint 14 is provided, which is connected to the actuating lever 5 at one end, and to a heating element carrier 15 at the other end. The second double swivel joint 14 is designed so as to be attached to the actuating lever 5 on a rotational axis extending parallel to the rotational axis 7 of the actuating lever 5. Using the double swivel joints 4 and 14, a hot wedge 16 of the heating element carrier 15 connected to the actuating lever 5 is moved close to a seam region between the tools 11, 11'. Moving the hot wedge 16 in closely takes place synchronously with the joining of the booms 3, 3' supporting the tools 11, 11' and the application of a tension force. For this purpose, the heating element carrier 15 is disposed so as to be linearly displaceable along guides 19 attached to the supporting frame 2. The additional double swivel joint 14 is pivotably mounted on the actuating lever 5, eccentrically with respect to the rotational axis 7 of the actuating lever 5, so that the heating element carrier 15 is pushed to the desired location when the actuating lever 5 is shifted. This movement of the exemplary hot wedge 16 is clearly apparent from FIGS. 3 to 5.

The tensioning device 17 shown and described in FIGS. 3 to 5 was described in conjunction with an automatic welding machine according to FIGS. 1 and 2 as one exemplary embodiment. The tensioning device 17 is not, however, limited to this particular automatic welding machine design, but rather can be used in all automatic welding machines of the type described at the outset. The additional step of moving the hot wedge 16 in closer is likewise an optional embodiment of the tensioning device 17. In an alternative exemplary embodiment, the heating device 16 can moreover be brought into the desired position by way of an extension provided on the actuating lever 5, without a further double swivel joint 14.

Although the device has been shown and described with respect to certain embodiments, it is obvious that equivalents and modifications will occur to others skilled in the art upon the reading and understanding of the specification. The device includes all such equivalents and modifications, and is limited only by the scope of the following claims.

The invention claimed is:

1. An automatic welding machine intended to fuse plastic webs, comprising a movable supporting frame, a heating device configured to partially melt the plastic webs, at least two opposing booms comprising pressing and advancing rollers, at least one driving device, and a tensioning device that is mounted on the supporting frame and comprises an actuating element for reversibly joining the booms and applying a tension force between the booms, having an open position in which the opposing booms are separated from one another by a gap and a closed position in which the opposing booms are joined to one another and braced with respect to one another, one boom of the at least two opposing booms being mounted pivotably in relation to the another one of the opposing booms and being able to be brought from the open into the closed position by actuation of the tensioning device, wherein:

- the tensioning device comprises a supporting element connected to the supporting frame and a spring-loaded element configured to generate the tension force;
- the spring-loaded element, at one end is rigidly connected to the supporting element and at an end opposite to the one end is connected to the actuating element, the actuating element comprising an actuating lever that is pivotable about an axis; and
- the actuating lever is mounted on the supporting frame so as to pivot about a further axis and thus forms a double swivel joint for the spring-loaded element, and
- wherein pivoting the actuating lever out of the open position into the closed position causes the spring-loaded element to be tensioned and thereby a torque to be applied onto the pivotable boom.

2. The automatic welding machine according to claim 1, wherein the supporting element and the pivotable boom are rigidly connected to one another and pivotable about a shared axis.

3. The automatic welding machine according to claim 1, wherein the tension force is defined by a preloading of the spring-loaded element.

4. The automatic welding machine according to claim 1, wherein the spring-loaded element is designed as a helical spring.

5. The automatic welding machine according to claim 1, wherein the tensioning device is configured to be operated by way of the actuating lever rigidly connected to the double swivel joint and/or the double swivel joint is configured to be pivoted between the open and closed positions by way of a motor.

6. The automatic welding machine according to claim 1, wherein the tensioning device is configured to be locked in the open position and the closed position.

7. The automatic welding machine according to claim 6, wherein the spring-loaded element is disposed on the supporting element such that, during a movement of the tensioning device from the open or closed position, respectively, to the closed or open position of the tensioning device, an axis of action of a spring force of the spring-loaded element traverses a rotational axis of the double swivel joint so that a portion of the spring force is directed against a pivoting of the double swivel joint out of the respective end position.

8. The automatic welding machine according to claim 1, wherein pivoting of the tensioning device allows the heating device to be moved close to the booms that are joined to one another.

9. The automatic welding machine according to claim 8, wherein the actuating lever is connected to a further double swivel joint, which in turn is connected to the heating device, so that the heating device can be retracted and extended by way of the actuating lever of the tensioning device.

10. The automatic welding machine according to claim 8, wherein the device is disposed so as to be linearly displaceable or pivotable in relation to the booms.

11. The automatic welding machine according to claim 1, wherein the heating device is designed as a hot air blower comprising a hot air nozzle that is oriented at the plastic webs to be fused and/or as a hot wedge disposed between the plastic webs.

* * * * *